(12) United States Patent
Matsubara

(10) Patent No.: US 6,552,785 B2
(45) Date of Patent: Apr. 22, 2003

(54) REFERENCE WAVELENGTH LIGHT GENERATING APPARATUS

(75) Inventor: Yasuaki Matsubara, Tokyo (JP)

(73) Assignee: Advantest Corporation, Tokyo (JP)

( * ) Notice: Subject to any disclaimer, the term of this patent is extended or adjusted under 35 U.S.C. 154(b) by 40 days.

(21) Appl. No.: 09/837,085

(22) Filed: Apr. 17, 2001

(65) Prior Publication Data

US 2001/0055112 A1 Dec. 27, 2001

(30) Foreign Application Priority Data

Apr. 27, 2000 (JP) ........................................ 2000-169791

(51) Int. Cl.[7] .............................. G01J 3/00; G01J 3/28; G01N 21/00
(52) U.S. Cl. ........................ 356/300; 356/326; 356/358; 356/432; 356/433
(58) Field of Search ................................ 356/300, 326, 356/346, 352, 358, 432, 433, 435; 250/252.1

(56) References Cited

U.S. PATENT DOCUMENTS

| | | | | | |
|---|---|---|---|---|---|
| 5,307,146 | A | * | 4/1994 | Porter et al. | 250/227.23 |
| 5,751,418 | A | * | 5/1998 | Kimura et al. | 250/339.07 |
| 5,946,090 | A | * | 8/1999 | Tashiro et al. | 356/301 |

* cited by examiner

Primary Examiner—Karl D. Frech
Assistant Examiner—April Nowlin
(74) Attorney, Agent, or Firm—Dellett and Walters

(57) ABSTRACT

A reference wavelength light generating apparatus is disclosed in which light emitted from a light source is branched by a light branching unit, one of the branched lights is extracted as a measuring beam and the other is extracted as reference wavelength light by passing through a collimator and an absorbing member and then being reflected by a reflecting member to return to the branching unit.

6 Claims, 5 Drawing Sheets

| P BRANCH No. | WAVELENGTH (nm) |
|---|---|
| 1 | 1525.7607 |
| 2 | 1526.3147 |
| 3 | 1526.8751 |
| 4 | 1527.4419 |
| 5 | 1528.0151 |
| 6 | 1528.5946 |
| 7 | 1529.1806 |
| 8 | 1529.7730 |
| 9 | 1530.3718 |
| 10 | 1530.9770 |
| ⋮ | ⋮ |

| P BRANCH No. | WAVELENGTH (nm) |
|---|---|
| 1 | 1543.1148 |
| 2 | 1543.8094 |
| 3 | 1544.5147 |
| 4 | 1545.2314 |
| 5 | 1545.9563 |
| 6 | 1546.6902 |
| 7 | 1547.4354 |
| 8 | 1548.1904 |
| 9 | 1548.9554 |
| 10 | 1549.7302 |
| ⋮ | ⋮ |

REFERENCE WAVELENGTH LIGHT GENERATING APPARATUS

BACKGROUND OF THE INVENTION

The present invention relates to a reference wavelength light generating apparatus for generating predetermined reference wavelength light in an optical spectrum analyzer and so on.

Normally, a measuring apparatus such as an optical spectrum analyzer performing various measurements by using a predetermined measuring beam often displays measurement results in a graphical form with its horizontal axis corresponding to wavelengths and its vertical axis corresponding to detection levels. In case of displaying such measurement results, there are cases where wavelengths of the horizontal axis deviate over time due to environment such as temperature. For this reason, wavelengths are adjusted to the horizontal axis by using predetermined reference wavelength light of which wavelength has a known absorption spectrum. An apparatus for generating reference wavelength light to be used for such calibration is the reference wavelength light generating apparatus.

FIG. 9 is a diagram showing configuration of a conventional reference wavelength light generating apparatus used for an optical spectrum analyzer and so on. Reference wavelength light generating apparatus 200 shown in FIG. 9 is intended to simultaneously generate predetermined reference wavelength light used for calibration and a predetermined measuring beam used for measurement, and is comprised of two light sources 210, 240, two fiber collimators 212, 214 and an optical cell 216.

The two light sources 210, 240 are formed by using an edge emitting type LED for instance. The light source 210 on the one hand is used to generate reference wavelength light, and the light emitted from this light source 210 is let into the fiber collimator 212 via an optical fiber 220 and is converted into parallel rays. These parallel rays pass through the optical cell 216 to have predetermined wavelength components absorbed. The parallel rays after passing through the optical cell 216 are led to an optical connector for reference wavelength light 230 via an optical fiber 222 after having their light gathered by the other fiber collimator 214. Moreover, the other light source 240 is used to generate a measuring beam, and any light emitted from this light source 240 is led to an optical connector for measuring beam 252 via an optical fiber 224.

Incidentally, there has been a problem that, in the above-mentioned conventional reference wavelength light generating apparatus, adjustments are not easy as to the two fiber collimators 212 and 214 placed sandwiching optical cell 216. To have the parallel rays emitted from fiber collimator 212 on the one hand exactly let into the other fiber collimator 214, the horizontal and vertical positions of the two fiber collimators as well as their respective angles of inclination must be adjusted. As there are so many points to be adjusted and adjustments of the adjusted angles and horizontal and vertical positions must be made simultaneously, it is not easy to perform desired adjustments exactly.

In addition, in the above-mentioned conventional reference wavelength light generating apparatus, there has been a problem that two light sources 210, 240 and two fiber collimators 212, 214 which are relatively expensive parts are used in order to generate reference wavelength light and a measuring beam so that production cost increases. For instance, a SELFOC lens that is a relatively expensive part is used for the above-mentioned fiber collimators 212, 214 affixed to one end each of the above-mentioned optical fibers 220, 222.

SUMMARY OF THE INVENTION

The present invention was devised in consideration of such points, and its object is to provide a reference wavelength light generating apparatus allowing time and effort for adjustments to be reduced and also capable of cost cutting by reducing the number of parts.

In order to attain the above-mentioned object, the reference wavelength light generating apparatus of the present invention is equipped with a light source for generating light having a predetermined wavelength range, an absorbing member for absorbing a predetermined wavelength component from incident light, a reflecting member for reflecting any light emitted from the above described absorbing member in the direction of the above described absorbing member, light branching unit for branching and emitting the light emitted from the above described light source in both a direction of the above described absorbing member and a direction different from that of the above described absorbing member and also branching and emitting the light incident from the above described absorbing member in both a direction of the above described light source arid a direction different from that of the above described light source, and a collimator for converting the light emitted from the above described light branching unit to the above described absorbing member side via an optical fiber into parallel rays at the end of the above described optical fiber and letting them into the above described absorbing member, in which the light branched from the above described light branching unit in a direction different from that of the above described light source is emitted as reference wavelength light and the light branched from the above described light branching unit in a direction different from the above described absorbing member is emitted as a measuring beam. As the light reflected by the reflecting member can be accurately let into the absorbing member again merely by adjusting an angle of the reflecting member, it can significantly reduce time and effort for adjustments required for generating reference wavelength light. In addition, as it can generate reference wavelength light and a measuring beam by using one light source, cost cutting by reducing the number of parts is possible. Moreover, the light having been converted into parallel rays by the collimator can easily proceed along a reverse optical path by passing through the absorbing member and then being reflected by the reflecting member. In particular, as the number of collimators used for letting into and emitting light to and from the absorbing member can be only one, the number of collimators, which is a relatively expensive component, can be reduced compared with a conventional case where two collimators in total are used at both ends of the absorbing member, so that cost cutting thereby is possible.

The reference wavelength light generating apparatus of the present invention is equipped with a light source for generating light having a predetermined wavelength range, an absorbing member for absorbing a predetermined wavelength component from incident light, a reflecting member for reflecting any light emitted from the above described absorbing member in the direction of the above described absorbing member, light branching unit for emitting the light emitted from the above described light source in a direction of the above described absorbing member and also branching and emitting the light incident from the above described absorbing member in both a direction of the above described light source and a direction different from that of the above described light source, and a collimator for converting the light emitted from the above described light branching unit to the above described absorbing member side via an optical fiber into parallel rays at the end of the above described optical fiber and letting them into the above described absorbing member, in which the light branched from the above described light branching unit in a direction different from that of the above described light source is emitted as reference wavelength light. As the light reflected by the reflecting member can be accurately let into absorbing member again merely by adjusting an angle of the reflecting member, it can significantly reduce time and effort for adjustments required for generating reference wavelength light. In addition, the light having been converted into parallel rays by the collimator can easily proceed along a reverse optical path by passing through the absorbing member and then being reflected by the reflecting member. In particular, as the number of collimators used for letting into and emitting light to and from the absorbing member can be only one, the number of collimators, which is a relatively expensive component, can be reduced compared with a conventional case where two collimators in total are used at both ends of the absorbing member, so that cost cutting thereby is possible.

Especially, in the case where the above-mentioned light source is comprised of an edge emitting type LED and the collimator is comprised of a SELFOC lens, the cost cutting effect by reducing the number of these expensive components is great.

Furthermore, the above-mentioned light branching unit has a light power branching ratio set so that power of the light emitted to the above described absorbing member side becomes lower than power of the light emitted to a direction different from that of the above described absorbing member. It is possible, by setting the light power branching ratio in this manner, to set the power of the measuring beam high. In addition, as it allows return light to the light source side from the absorbing member side to be reduced, it can prevent the light source from becoming unstable.

DESCRIPTION OF THE PREFERRED EMBODIMENT

Figure 1:
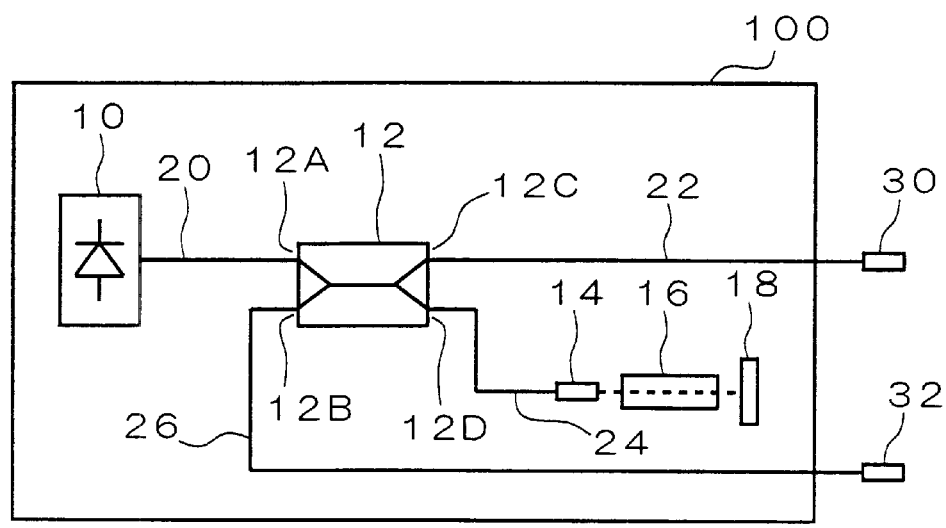
FIG. 1 is a diagram showing configuration of a reference wavelength light generating apparatus of an embodiment.

A reference wavelength light generating apparatus of an embodiment to which the present invention is applied will be described hereafter by referring to the drawings.

FIG. 1 is a diagram showing configuration of a reference wavelength light generating apparatus of this embodiment. Reference wavelength light generating apparatus 100 shown in FIG. 1 is included in various measuring apparatuses such as an optical spectrum analyzer, and simultaneously generates predetermined reference wavelength light used for calibration and a predetermined measuring beam used for measurement. This reference wavelength light generating apparatus 100 is comprised of light source 10, light coupler 12, fiber collimator 14, optical cell 16 and plane mirror 18.

Light source 10 is formed by using an edge emitting type LED for instance, and emits light of a wave band of a relatively wide range of which peak is 1.55 $\mu$m.

Light coupler 12 has four input-output terminals 12A, 12B, 12C and 12D. Light let into either input-output terminals 12A or 12B is branched at a predetermined ratio by light coupler 12 and emitted from the two input-output terminals 12C and 12D. Also, light let into either input-output terminals 12C or 12D is branched at a predetermined ratio by light coupler 12 and emitted from the two input-output terminals 12A and 12B.

In reference wavelength light generating apparatus 100 of this embodiment, light emitted from light source 10 is let into input-output terminal 12A, and part of this incident light is emitted from input-output terminal 12C. The input-output terminal 12C is connected to optical connector for measuring beam 30 via optical fiber 22, and the light emitted from input-output terminal 12C is extracted as a measuring beam as-is from optical connector for measuring beam 30. In addition, the remaining incident light for input-output terminal 12A is emitted from input-output terminal 12D. The input-output terminal 12D is connected to fiber collimator 14 via optical fiber 24, and the light emitted from input-output terminal 12D is let into fiber collimator 14 and also the light emitted to optical fiber 24 from this fiber collimator 14 is let into input-output terminal 12D again.

The light thus let into input-output terminal 12D again is partly emitted from input-output terminal 12B. The input-output terminal 12B is connected to optical connector for reference wavelength light 32 via optical fiber 26, and the light emitted from input-output terminal 12B is extracted as-is from optical connector for reference wavelength light 32.

Fiber collimator 14 is affixed to one end of optical fiber 24, and it converts light emitted from this end into parallel rays and emits them to the side of optical cell 16 and also gathers parallel rays incident from the side of optical cell 16 and lets them into one end of optical fiber 24. A SELFOC lens, for instance, is used for fiber collimator 14.

Optical cell 16 is an absorption cell in which acetylene gas is sealed, and it absorbs predetermined wavelength components by having light pass through it.

Plane mirror 18 is placed in a position opposite fiber collimator 14 with optical cell 16 sandwiched between them, and is used to reflect the parallel rays emitted after passing through optical cell 16 and let them into optical cell 16 again. In case of considering plane XY which is vertical to the direction of incident parallel rays, a rotation angle around the X axis and a rotation angle around the Y axis are separately adjustable, and this adjustment allows reflected light to be turned exactly to the direction of the incident light.

The above-mentioned light coupler 12 corresponds to light branching unit, optical cell 16 corresponds to an absorbing member and plane mirror 18 corresponds to a reflecting member respectively.

Reference wavelength light generating apparatus 100 of this embodiment has such configuration, and the following describes its action.

Light emitted from light source 10 is branched into two by light coupler 12, where one of them is emitted from optical connector for measuring beam 30 via optical fiber 22 and the other is emitted as parallel rays from fiber collimator 14 via optical fiber 24. The emitted parallel rays are reflected on plane mirror 18 after passing through optical cell 16, gathered by fiber collimator 14 after passing through optical cell 16 again to be let into input-output terminal 12D of light coupler 12 via optical fiber 24. The light thus let into input-output terminal 12D is further branched by light coupler 12, and one of them is emitted from optical connector for reference wavelength light 32 via optical fiber 26.

Figure 2:
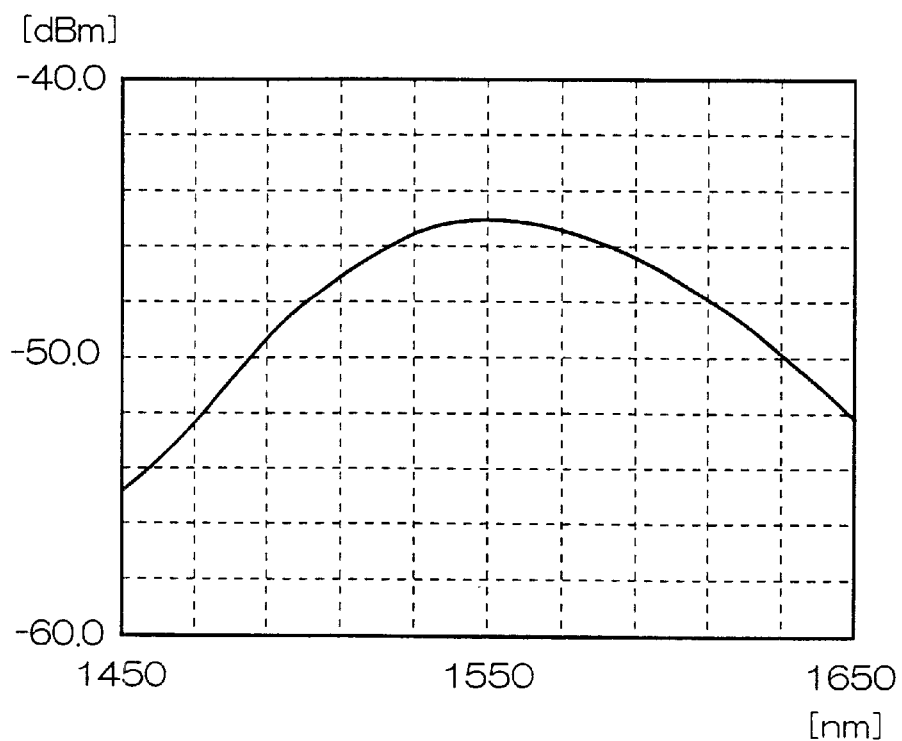
FIG. 2 is a diagram showing characteristics of light emitted from a light source.

FIG. 2 is a diagram showing characteristics of light emitted from light source 10. Its horizontal axis and its vertical axis correspond to wavelength and light intensity respectively. As shown in FIG. 2, it is understandable that, as characteristics of the light emitted from light source 10, its peak is around 1550 nm and it gradually attenuates as it goes away from the peak position.

Figure 3:
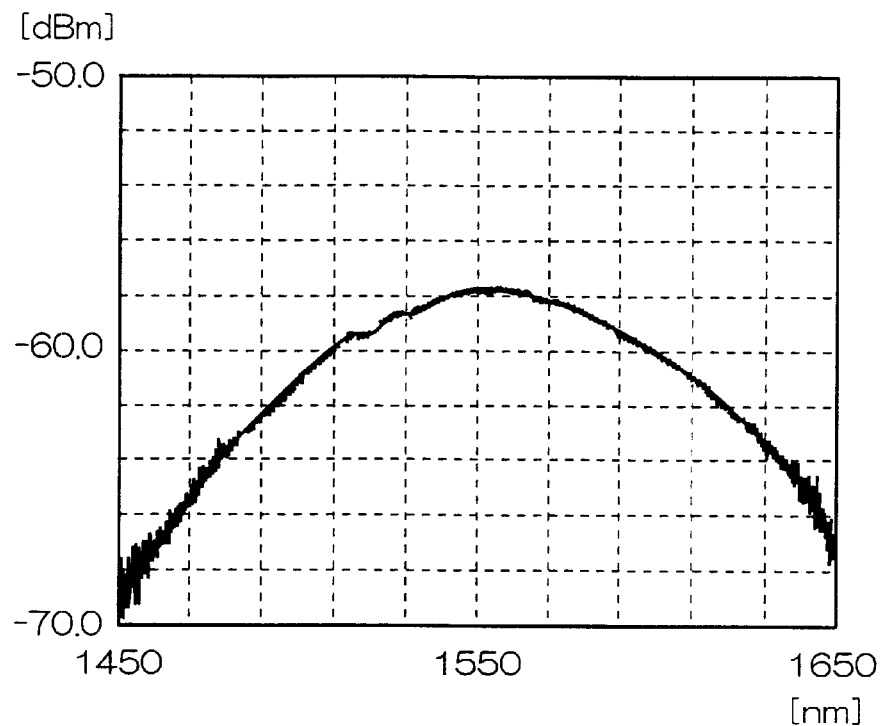
FIG. 3 is a diagram showing characteristics of light emitted from an optical connector for a measuring beam.

FIG. 3 is a diagram showing characteristics of light emitted from an optical connector for a measuring beam 30. The light emitted from optical connector for a measuring beam 30 is the light emitted from light source 10 which had its overall strength attenuated by passing through light coupler 12, so that its characteristics are basically the same as those shown in FIG. 2.

Figure 4:
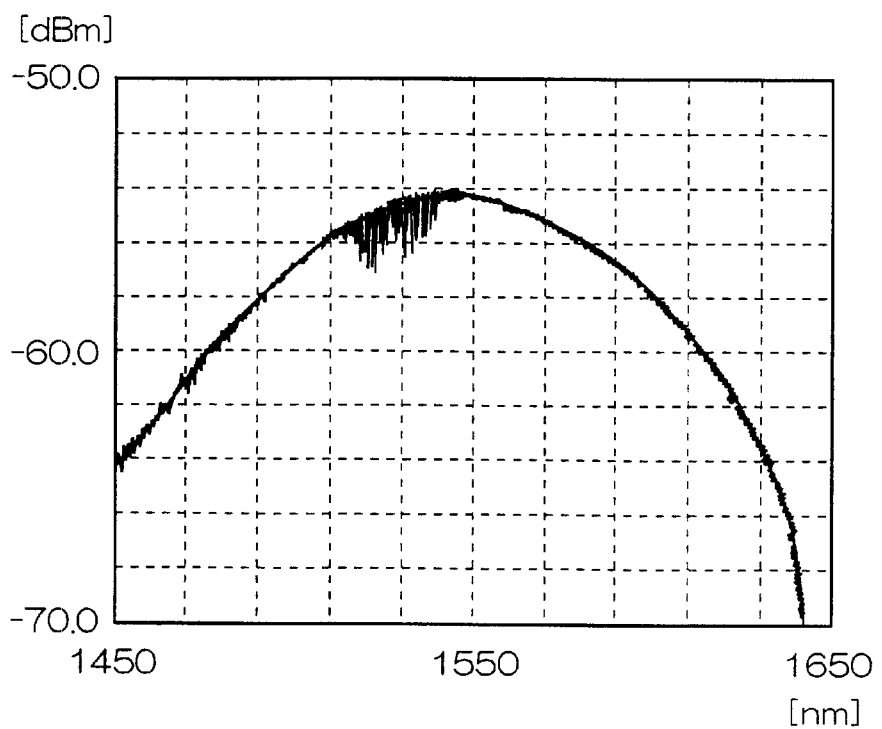
FIG. 4 is a diagram showing characteristics of light emitted from an optical connector for reference wavelength light.

FIG. 4 is a diagram showing characteristics of light emitted from optical connector for reference wavelength light 32. The light emitted from optical connector for reference wavelength light 32 is the light emitted from light source 10 which had its overall strength attenuated by passing through light coupler 12 and also had its strength partially attenuated corresponding to specific wavelength components by passing through optical cell 16 twice to and fro.

Figures 5, 6:
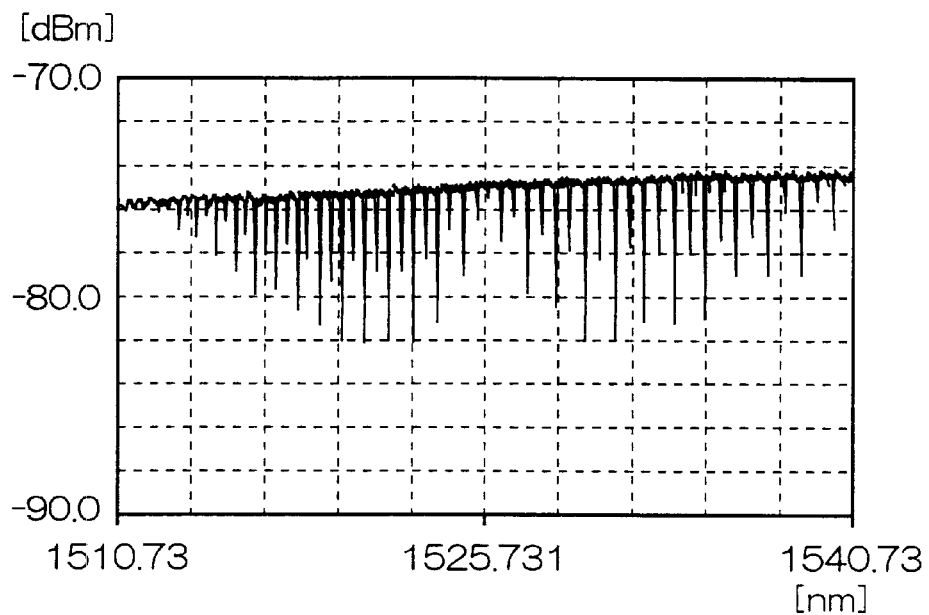
FIG. 5 is a diagram showing an absorption spectrum generated by passing through an optical cell.
FIG. 6 is a diagram showing concrete values of an absorption spectrum of acetylene gas.

FIG. 5 is a diagram showing an absorption spectrum generated by passing through optical cell 16, which is expansion of the portion around 1525 nm of the characteristics shown in FIG. 4. In addition, FIG. 6 is a diagram showing concrete values of an absorption spectrum. The absorption spectrum shown in FIG. 5 can be roughly divided into two groups, where a group on the left is called R branch and a group on the right is called P branch. FIG. 6 shows the peaks of absorption spectrums contained in P branch in increasing order of wavelength. As wavelengths of these peaks hardly change according to environment of use such as temperature, it is used in an optical spectrum analyzer having reference wavelength light generating apparatus 100 of this embodiment in order to calibrate wavelength axes (horizontal axes) of various measurement results.

Thus, reference wavelength light generating apparatus 100 of this embodiment uses plane mirror 18 to reflect parallel rays emitted from optical cell 16 toward optical cell 16 again. As it is required only to turn the parallel rays in the incident direction, it is sufficient to adjust inclination of plane mirror 18, so that adjustments are very easy compared with the case of conventional reference wavelength light generating apparatus 200 shown in FIG. 9 where the angle must be adjusted while adjusting the vertical and horizontal directions of two fiber collimators.

In addition, reference wavelength light generating apparatus 100 of this embodiment requires only one each of light source and fiber collimator whereas conventional reference wavelength light generating apparatus 200 required two each, and thus it can realize significant cost cutting by reducing the number of these expensive parts. Moreover, while plane mirror 18 and light coupler 12 are newly added in this embodiment, they are relatively low-cost compared with a light source using an edge emitting type LED and a fiber collimator using a SELFOC lens, so it allows cost cutting as overall reference wavelength light generating apparatus 100.

Figure 9:
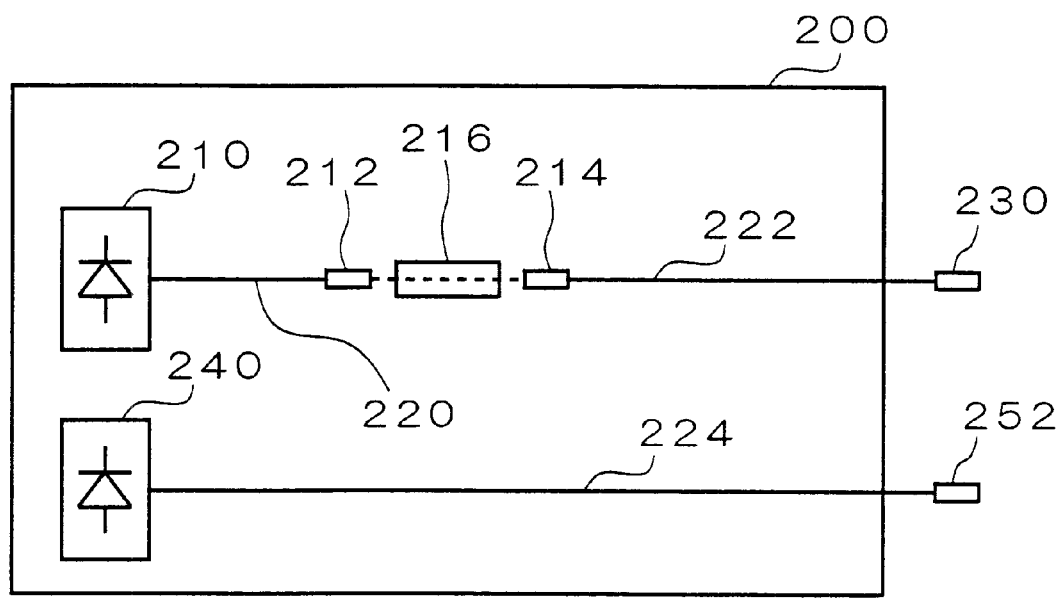
FIG. 9 is a diagram showing configuration of a conventional reference wavelength light generating apparatus.

Furthermore, as reference wavelength light generating apparatus 100 of this embodiment passes light through optical cell 16 twice, the length of optical cell 16 can be half, to acquire the same attenuation, compared with a case shown in FIG. 9 where the light passes through it only once. Thus, it allows the entire apparatus to be rendered smaller.

Incidentally, while the above-mentioned description of this embodiment does not especially refer to the light power branching ratio in light coupler 12, it is preferable to set it so that power of the light emitted to the side of optical connector for measuring beam 30 becomes higher than power of the light emitted to the side of optical cell 16, rather than 50 to 50. In particular, when using this reference wavelength light generating apparatus 100 for an optical spectrum analyzer, it is necessary to render power of the measuring beam emitted from optical connector for measuring beam 30 high. Therefore, in case of paying attention to the measuring beam, it is desirable to keep loss by light coupler 12 to a minimum. Also, it causes no inconvenience if the reference wavelength light emitted from optical connector for reference wavelength light 32 has low power, since it is merely used as reference of wavelength. Considering these points, it is preferable to set the above-mentioned light power branching ratio in light coupler 12 at around 90 to 10 or 80 to 20.

In addition, if such a light power branching ratio is set, the light incident from input-output terminal 12D can render power of the light emitted to the side of light source 10 from input-output terminal 12A lower (it becomes $\frac{1}{10}$ or $\frac{1}{5}$ of power of the light incident from input-output terminal 12D), which can prevent light source 10 from becoming unstable and generating a ripple to light of a predetermined wavelength range (ideally light of a flat spectrum).

Moreover, the present invention is not limited to the above-mentioned embodiment, but various deformed embodiments are possible within the range of the abstract of the present invention. For instance, while the above-mentioned embodiment describes reference wavelength light generating apparatus 100 for simultaneously generating reference wavelength light and a measuring beam, it is also possible to have it generate only reference wavelength light.

Figures 7, 8:
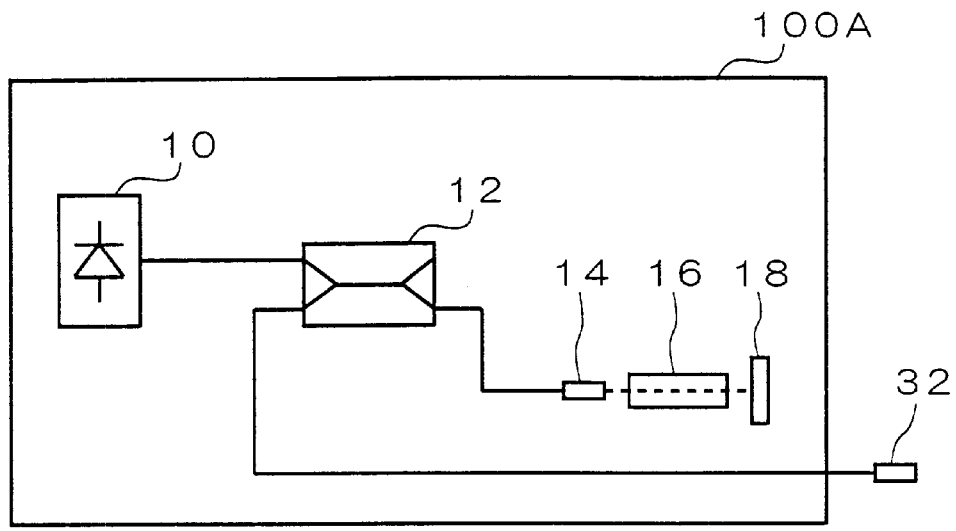
FIG. 7 is a diagram showing configuration of a reference wavelength light generating apparatus generating only reference wavelength light.
FIG. 8 is a diagram showing concrete values of an absorption spectrum of cyanide gas.

FIG. 7 is a diagram showing configuration of a reference wavelength light generating apparatus 100A generating only reference wavelength light. Reference wavelength light generating apparatus 100A shown in FIG. 7 is reference wavelength light generating apparatus 100 shown in FIG. 1 from which optical fiber 22 and optical connector for measuring beam 30 connected to light coupler 12 are eliminated. Thus, even in case of generating only reference wavelength light, the effects of easier adjustments and a smaller size of the apparatus due to use of shorter optical cell 16 remain unchanged.

In addition, while the above-mentioned embodiment uses optical cell 16 in which acetylene gas is sealed, it is also possible to use an optical cell in which gas other than acetylene, hydrogen cyanide (HCN) for instance is sealed.

FIG. 8 is a diagram showing concrete values of an absorption spectrum of cyanide gas. As in case of optical cell 16 using acetylene gas, the absorption spectrums using cyanide gas can be roughly divided into two groups. FIG. 8 shows the peaks of absorption spectrums contained in P branch which is a group on the right in increasing order of wavelength.

What is claimed is:

1. A reference wavelength light generating apparatus comprising:
    a light source for generating light having a predetermined wavelength range;
    an absorbing member for absorbing a predetermined wavelength component from incident light;
    a reflecting member for reflecting any light emitted from said absorbing member in a direction of said absorbing member;
    light branching unit for branching and emitting the light emitted from said light source in both a direction of said absorbing member and a direction different from that of said absorbing member and also branching and emitting the light incident from said absorbing member in both a direction of said light source and a direction different from that of said light source; and
    a collimator for converting the light emitted from said light branching unit to said absorbing member side via an optical fiber into parallel rays at an end of said optical fiber and letting said parallel rays into said absorbing member,
    wherein the light branched from said light branching unit in a direction different from that of said light source is emitted as reference wavelength light and the light branched from said light branching unit in a direction different from said absorbing member is emitted as a measuring beam.

2. The reference wavelength light generating apparatus according to claim a, wherein said light source is an edge emitting LED and said collimator is a SELFOC lens.

3. The reference wavelength light generating apparatus according to claim a, wherein said light branching unit has a light power branching ratio set so that power of the light emitted to said absorbing member side becomes lower than power of the light emitted to a direction different from that of said absorbing member.

4. A reference wavelength light generating apparatus comprising:
    a light source for generating light having a predetermined wavelength range;
    an absorbing member for absorbing a predetermined wavelength component from incident light;
    a reflecting member for reflecting any light emitted from said absorbing member in a direction of said absorbing member;
    light branching unit for emitting the light emitted from said light source toward said absorbing member and also branching and emitting the light incident from said absorbing member in both a direction of said light source and a direction different from that of said light source; and
    a collimator for converting the light emitted from said light branching unit to said absorbing member side via an optical fiber into parallel rays at an end of said optical fiber and letting said parallel rays into said absorbing member,
    wherein the light branched from said light branching unit in a direction different from that of said light source is emitted as reference wavelength light.

5. The reference wavelength light generating apparatus according to claim 4, wherein said light source is an edge emitting LED and said collimator is a SELFOC lens.

6. The reference wavelength light generating apparatus according to claim 4, wherein said light branching unit has a light power branching ratio set so that power of the light emitted to said absorbing member side becomes lower than power of the light emitted to a direction different from that of said absorbing member.

* * * * *